Patented June 9, 1925.

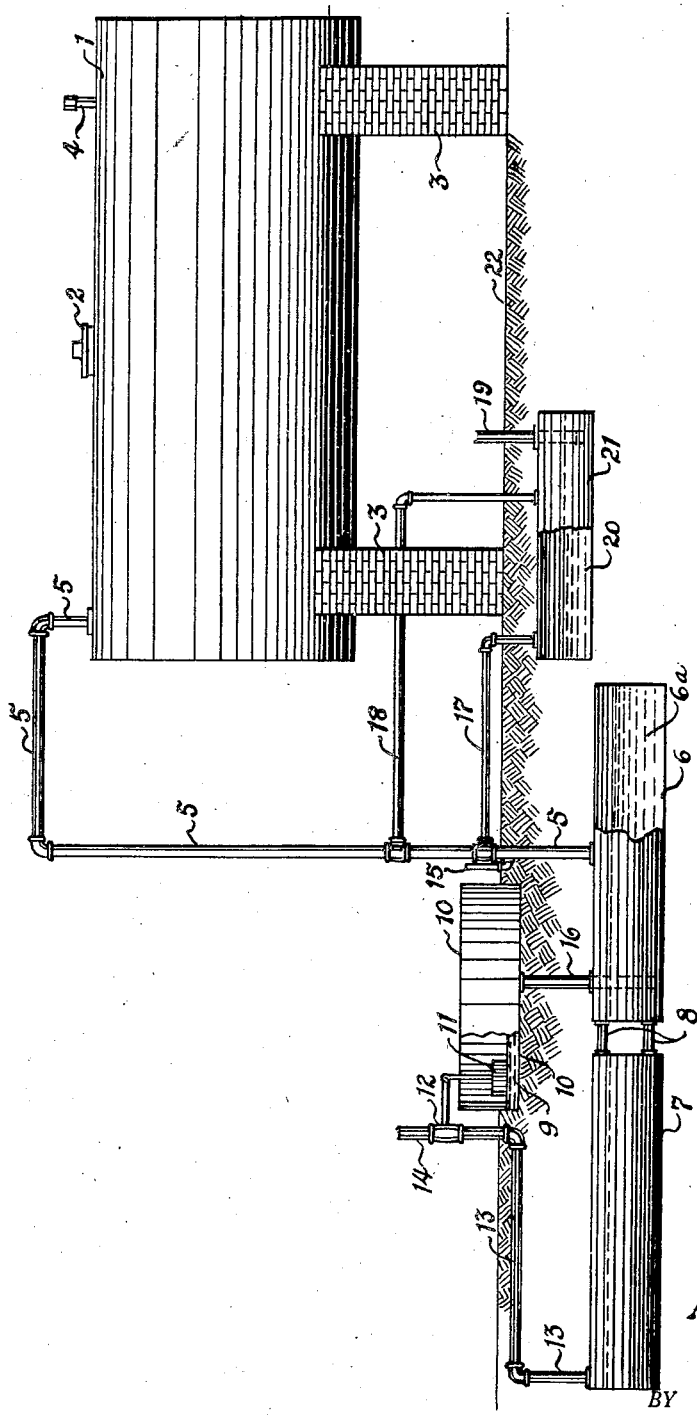

1,541,591

UNITED STATES PATENT OFFICE.

ARTHUR E. SADLER, OF HENRIETTA, TEXAS.

VAPORPROOF STORAGE TANK.

Application filed March 1, 1924. Serial No. 696,147.

*To all whom it may concern:*

Be it known that I, ARTHUR E. SADLER, a citizen of the United States, residing at Henrietta, in the county of Clay and State of Texas, have invented certain new and useful Improvements in Vaporproof Storage Tanks, of which the following is a specification.

This invention relates to an apparatus for storing gasoline and hydrocarbon liquids and refers more particularly to a certain arrangement of tanks for this purpose.

An object of the invention is to provide an apparatus whereby the lighter gases given off by the liquids cannot escape without passing through a condensing process which returns the hydro-carbonic elements to liquid form.

A further object is to provide an apparatus of this character which will alleviate the pressure caused by expansion of the gases from heat, or pressure caused by forcing more liquid into the apparatus.

Another object is the provision of an apparatus which will be practically fireproof.

The invention also provides for an apparatus of this nature which is relatively economical to install and practical and durable.

In carrying out the invention there is provided an arrangement of tanks in addition to the main storage tank 1, such arrangement clearly depicted in the drawing accompanying the description, and which illustrates a side elevational view of the preferred form of the invention.

The tank 1 has a manhole 2, the tank being supported upon base structures of brick or other suitable material 3—3. An air intake valve 4 is located in the upper portion of the tank for the purpose of drawing air into the tank as the liquid therein passes out.

The gas outlet pipe 5 extends from the upper portion of the tank to a subterranean reservoir or series of reservoirs 6 and 7. These reservoirs are connected by suitable piping 8—8 at their upper and lower portions.

From the first reservoir 6 leads a vertical pipe 16, one end of which is adjacent the bottom of the reservoir, and passes to a water tank 10, within which water 9 is placed. From the last reservoir 7 a gas outlet pipe 13 extends upward to a valve 12. This valve is controlled by a float 11 which rides on the surface of the water 9. From the valve a pipe 14 extends to a distant point. Pipe 17, cut into or connected from pipe 5 extends to a reservoir 20, adjacent reservoir 6. This reservoir acts as a trap for condensed gases from the series of reservoirs 6 and 7. Pipe 18 is a vent to allow the pressure in the trap and in the pipe 5 to be equalized.

19 is an outlet from the trap to pump or draw off the liquid 20 therein. The ground line is designated by the figure 22.

In operation, the pressure being caused in the main tank either by introducing more liquid therein or by external heat on the tank. The gas under pressure follows the pipe 5 to the series of reservoirs 6 and 7. The water 6ª in the reservoirs 6 and 7 is forced upward by the gas pressure into the tank 10, thereby causing a space in the reservoirs 6 and 7 within which the gases may be condensed by the cooler temperature caused by the surrounding soil. If the pressure increases until the water is removed from the series of reservoirs the float in the water tank 10 opens the valve 12 and allows the surplus gas to escape through the pipe 14.

As the pressure in the tank 1 is reduced the water forces the condensed gases from the reservoirs into the pipe 5.

The condensed gases rising in liquid form in the pipe 5 pass through pipe 17 to trap 21.

It should be understood that various changes in arrangement of the tanks and piping may be made without departing from the spirit and intent of the invention also that several tanks may be joined into the pipe 5 by suitable connections, and the members of the reservoirs may be increased.

What is claimed is:

1. In an apparatus for storing hydro-carbon liquids, a main storage tank, a base for said tank, an intake therein, reservoirs; a main pipe connecting the tank with the reservoirs from the top of the tank to the top of the reservoirs, a water tank above the reservoirs, a pipe from the bottom of said water tank into and extending to a point adjacent the bottom of one of the reservoirs, a float in the water tank, a gas outlet pipe from the reservoirs to a distant point, a valve in said pipe adapted to be operated by the movement of the float in the water tank, a trap connected into the main pipe at its top and bottom, and a pipe extending from the trap to the surface of the ground.

2. In an apparatus for storing liquids, a main storage tank, a base for said tank, an intake extending from the upper portion of the tank, a main gas outlet pipe extending from the top of the tank to a series of subterranean reservoirs, a water tank above the reservoirs; a pipe from the water tank to the reservoirs, pipes connecting the reservoirs, a gas outlet from the chain of reservoirs, a valve in the gas outlet, a float in the water tank adapted to operate the valve when the water rises or falls in the tank, a subterranean gas trap having pipe connections to the main pipe at two points extending from the trap to the surface of the ground.

3. An apparatus of the nature described comprising a main gasoline storage tank, a plurality of water tanks, one of the latter being above the ground and having a float valve, and the remainder under the surface of the ground; a gas accumulating tank below the ground surface, and pipes connecting all of the tanks together, the arrangement being such that gas pressure from the storage tank will displace the water in the underground water tanks and force it into the above ground water tank, and that the gas entering the underground tanks will be condensed into liquid form and forced by the water back pressure into said gas accumulating tank; means for controlling excessive gas pressure by the float valve; means for equalizing the pressure of gas in the gas accumulator tank and means for conveying said accumulation away.

4. An apparatus of the character described comprising a series of auxiliary tanks and a gas accumulator tank in connection with a main storage tank and water tank; means for connecting all the tanks together; said apparatus so arranged that gas from liquid in the storage tank will displace the water in water tanks, said gas being condensed into liquid form in said water tanks and forced by water pressure into said gas accumulator tank.

In testimony whereof I have signed my name to this specification.

ARTHUR E. SADLER.